United States Patent
Chay et al.

(10) Patent No.: US 12,009,922 B2
(45) Date of Patent: Jun. 11, 2024

(54) TRANSMISSION FRAME FILTERING

(71) Applicant: Intel Corporation, Santa Clara, CA (US)

(72) Inventors: Dor Chay, Haifa (IL); Itamar Borochov, Zurit (IL); Ofir Klein, Petah-Tiqwa (IL); Chen Kojokaro, Yoqneam Illit (IL); Nadav Szanto, Haifa (IL)

(73) Assignee: Intel Corporation, Santa Clara, CA (US)

( * ) Notice: Subject to any disclaimer, the term of this patent is extended or adjusted under 35 U.S.C. 154(b) by 657 days.

(21) Appl. No.: 17/132,081

(22) Filed: Dec. 23, 2020

(65) Prior Publication Data

US 2022/0200727 A1   Jun. 23, 2022

(51) Int. Cl.
*H04L 1/00* (2006.01)

(52) U.S. Cl.
CPC .......... *H04L 1/0072* (2013.01); *H04L 1/0041* (2013.01); *H04L 1/0045* (2013.01); *H04L 1/0057* (2013.01)

(58) Field of Classification Search
CPC ... H04L 1/0041; H04L 1/0045; H04L 1/0057; H04L 1/0061; H04L 1/0064; H04L 1/0072
See application file for complete search history.

(56) References Cited

U.S. PATENT DOCUMENTS

2017/0094328 A1 * 3/2017 Herrmann ............ H04N 21/235
2018/0048572 A1 * 2/2018 Gulati .................... H04L 47/12

* cited by examiner

*Primary Examiner* — Shelly A Chase
(74) *Attorney, Agent, or Firm* — Banner & Witcoff Ltd.

(57) ABSTRACT

A method of processing wireless signals, including: receiving a wireless signal carrying a transmission frame having a physical layer header including a data rate index; decoding the physical layer header including the data rate index; filtering out the transmission frame for no further processing if a measured physical layer header energy is below an energy threshold corresponding to the decoded data rate index; decode a sample portion of data codewords of the transmission frame if the transmission frame is not filtered out, wherein the sample portion of data codewords is less than all of the data codewords of the transmission frame; and filtering out the transmission frame for no further processing if the decoding of the sample portion of data codewords fails, and otherwise decode a remainder of the transmission frame.

25 Claims, 3 Drawing Sheets

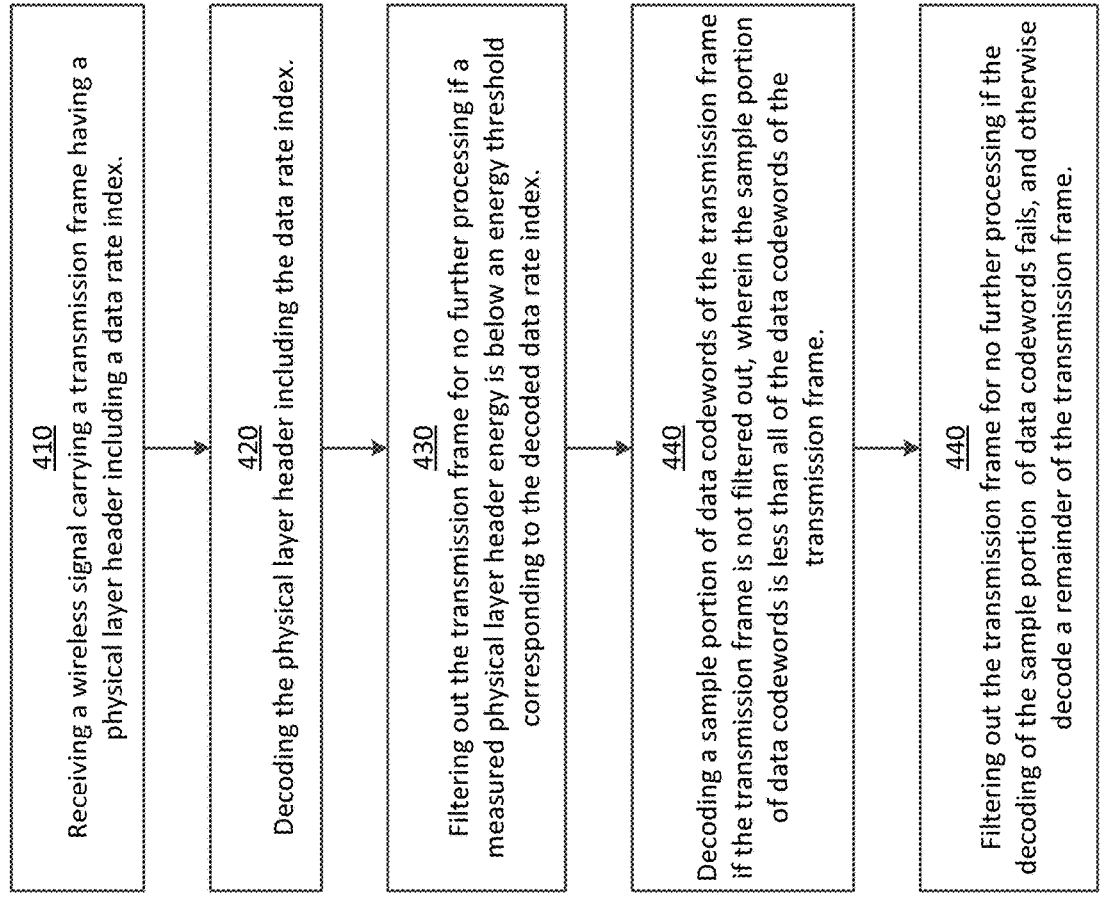

TRANSMISSION FRAME FILTERING

TECHNICAL FIELD

The present disclosure generally relates to a wireless signal processing, and more specifically, to wireless signal processing with transmission frame filtering.

BACKGROUND

In a congested wireless signal environment, a wireless station may overhear transmission frames carried on a signal of a different basic service set (BSS). Only one transmission frame is directed to the wireless station at a time. In order for the wireless station to avoid a state of deafness and missing transmission frames, it is preferable for the wireless station to filter out any unwanted transmission frames in a reception flow as early as possible.

One typical signal processing scheme (e.g., IEEE 802.11ac) filters out unwanted transmission frames at the Medium Access Control (MAC) header based on a receive address. Another typical signal processing scheme (e.g., IEEE 802.11ax) filters out unwanted transmission frames that are received from another BSS, at the Physical Layer Convergence Protocol (PLCP) header according to "BSS color." However, if the received signal is an intra-BSS signal (e.g., access point receives signal from a wireless station within the same BSS), the MAC header filtering based on the receive address is necessary.

These typical signal processing schemes have disadvantages. If a wireless station receives a misdirected transmission frame, this wireless station may require an entire aggregate MAC layer protocol data unit (A-MPDU) duration to classify the transmission frame as "not for us," filter out the transmission frame, and stop the reception flow. This is because the lower MAC waits for a first successfully decoded MAC header in order to perform receiver and MAC address matching. Since the MAC header is encoded with the same Modulation and Coding Scheme (MCS) as data, if the signal-to-noise ratio (SNR) level does not allow this wireless station to decode this MCS, the wireless station will wait for a next MAC header in the A-MPDU, and eventually may end up waiting the entire A-MPDU duration. In the meanwhile, the wireless station is deaf to receiving other transmission frames.

BRIEF DESCRIPTION OF THE DRAWINGS

FIG. 3 is a table of Modulation and Coding Scheme (MCS) indexes with respective energy thresholds in accordance with aspects of the disclosure.

FIG. 4 is a flowchart illustrating a wireless signal processing method in accordance with aspects of the disclosure.

DESCRIPTION OF THE ASPECTS

Figure 1:
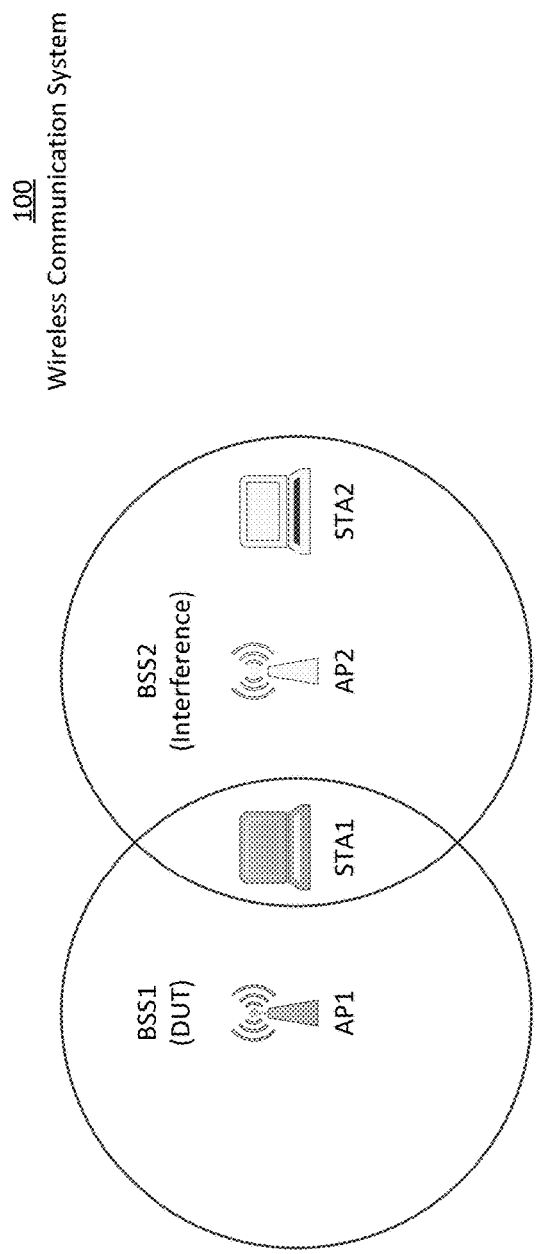
FIG. 1 is a diagram illustrating an exemplary wireless communication system providing an environment for wireless signal processing with transmission frame filtering in accordance with aspects of the disclosure.

FIG. 1 is a diagram illustrating an exemplary wireless communication system 100 providing an environment for wireless signal processing with transmission frame filtering in accordance with aspects of the disclosure.

The wireless communication system 100 has a first basic service set BSS1 and a second basic service set BSS2. Client station STA1 is associated with a first access point AP1 within the first basic service set BSS1, and client station STA2 is associated with a second access point AP2 within the second basic service set BSS2. And each of the first access point AP1 and the second access point AP2 may be connected to one or more other networks (not shown).

A basic service set is a group of wireless stations communicating at the physical layer level. BSS can either be infrastructure BSS (i.e., client stations communicate with other client stations through access points), or independent BSS (i.e., client stations communicate on a peer-to-peer basis in an ad hoc manner). The communication system 100 may be a Wireless Local Access Network (WLAN), and more specifically, a WLAN that operates in accordance with a version of the IEEE 802.11 protocol, for example, though this is not meant to be limiting. Wireless stations comprise of all devices and equipment that are connected to the WLAN. A wireless station can be an access point or a client station (e.g., workstations, computers, laptops, printers, smart phones, etc.)

In this example, the first basic service set BSS1 and the second basic service set BSS2 transmit over a same transmission channel and width. Each circle represents the respective basic service set coverage area. The first basic service set BSS1 and the second basic service set BSS2 have an overlapping coverage area. The first client station STA1 receives wanted frames from the first access point AP1. But the first client station STA1 is also positioned at a coverage area edge of the second basic service set BSS2. The first client station STA1 thus receives, from the second access point AP2, unwanted frames with low energy and high Modulation and Coding Scheme (MCS) such that it cannot decode unwanted MAC header frames. This causes the first client station STA1 to experience deafness as described above. In addition, the first access point AP1 does not hear the traffic from the second basic service set BSS2, hence the first access point AP1 continues to transmit to the first client station STA1, and upon failures might perform rate adaptation to reduce transmission rate, thereby further degrading transmission performance.

The aspects of this disclosure resolves this overlapping coverage area problem by filtering out unwanted transmission frames in two filtering steps: (1) a first filtering decision by lower MAC (LMAC) firmware based on physical layer header energy; and (2) a second filtering step by a processor based on decoding a sample portion of codewords. These filtering steps are discussed in detail below, following a general discussion about transmission frame structure.

Transmission Frame Structure

Figure 2:
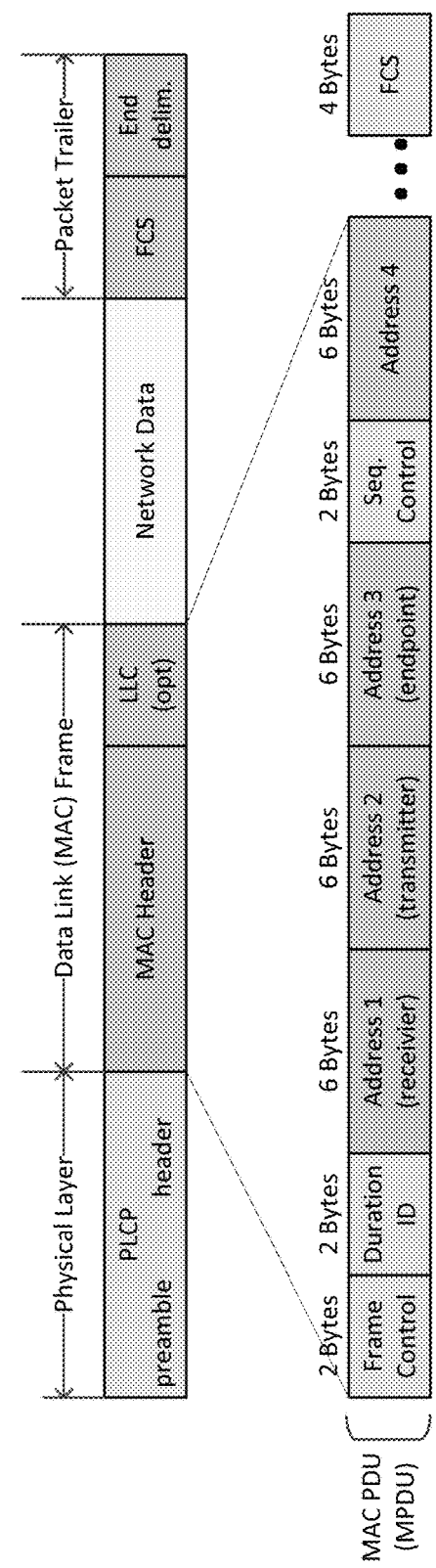
FIG. 2 is a block diagram illustrating a portion of a typical transmission frame structure.

FIG. 2 is a block diagram illustrating a portion of a typical transmission frame structure 200. The transmission frame is carried on wireless signals exchanged between stations, such as access points and/or wireless stations.

The physical layer is concerned with transmitting raw bits over a communication channel. The Physical Layer Convergence Protocol (PLCP) protocol (shown on the left-hand side of the upper line) prepares MAC protocol data units (MPDUs) (shown as the lower line) for transmission. The PLCP appends a physical layer specific preamble and header fields to the MAC PDU (MPDU) with information needed by the physical layer transmitters and receivers. The IEEE 802.11 protocols, for example, refer to this composite frame (the MPDU with an additional PLCP preamble and header) as a PLCP protocol data unit (PPDU).

The MPDU is located in the MAC sublayer, which is one of two layers within the protocol stack's data link layer. The MAC sublayer provides an abstraction of the physical layer to the data link layer's logical link control sublayer and upper layers of the protocol stack. The MAC sublayer is responsible for encapsulating frames and describing frame formats. The MPDU has three main components: a MAC header, a frame body, and a frame check sequence (FCS). The MAC header includes the frame control field, MAC addressing, duration, and sequence control. The frame control field is made up of a plurality of subfields (e.g., protocol version, type, subtype, etc.). The duration field is how long the frame and its acknowledgement will occupy the channel. The address fields are the receiver address, transmitter address, and distant endpoint address when an access point acts as a relay. The sequence control field numbers frames so that duplicates can be detected. The frame body is made up of a data field containing the payload. The FCS field contains a cyclic redundancy check (CRC) to verify integrity of the MSDU data frames.

Transmission frame structures and protocol stacks are generally known. The above general description is by way of background, incomplete, and not meant to be limiting.

Transmission Frame Filtering Overview

By way of overview, after a station receives a wireless signal carrying a transmission frame having a physical layer header including a data rate index, the station performs two filtering steps. The idea is for the station to filter out unwanted transmission frames as early as possible in the reception flow.

In a first filtering step, the station decodes the physical layer header including the data rate index, and filters out the transmission frame for no further processing if a measured physical layer header energy is below an energy threshold corresponding to the decoded data rate index. If the transmission frame is not filtered out in the first filter step, the processing continues.

In a second filtering step, the station decodes a sample portion of data codewords of the transmission frame, and filtering out the transmission frame for no further processing if the decoding of the sample portion of data codewords fails. If the transmission frame is not filtered out in the second filtering step, the station decodes a remainder of the transmission frame.

First Filtering Step Based on Physical Layer Header Energy

The station receives a wireless signal carrying a transmission frame having a physical layer header, which may be a Physical Layer Convergence Protocol (PLCP) header, as described above with respect to FIG. 2.

The PLCP header is transmitted with robust modulation, meaning it can be received by all stations within range. If a station can receive the PLCP header portion of the transmission frame, it is a good start for receiving the remainder of the transmission frame. If a station cannot receive the PLCP header, the station would not be able to receive the remainder of the transmission frame.

The station parses the PLCP header to extract two values. First, the station decodes the PLCP header to obtain the data rate index. Also, the station measures the energy over the PLCP header. The data rate index may be, for example, a modulation and coding scheme (MCS) index. The physical layer header energy may be measured based on Received Signal Strength Indicator (RSSI), for example. The energy may be expressed in mW or dBm, for example.

FIG. 3 is an exemplary table of modulation and coding scheme (MCS) indexes with respective energy thresholds in accordance with aspects of the disclosure. Modulation and coding schemes are known, and for the sake of brevity, will not be described in detail here. Basically, in order to optimize data throughput for all link conditions, a typical wireless protocol has a series of defined MCS sets labeled with respective indexes that range from, for example, MCS0 for more difficult links with weak wireless signals, to MCS11 for high quality links which are able to support a highest data throughput. Between these two extremes there are the other MCS sets that are able to provide different levels of error correction and forms of modulation. Adjusting between the different MCSs based on link conditions is known as rate adaptation. A main strategy used to increase successful transmissions is for the transmitting station to lower the transmission rate. Slower rates use more robust modulations that are more likely to be received correctly for a given signal-to-noise ratio (SNR). If too many transmission frames are lost, a transmitting station can lower the rate. If frames are delivered with low loss, a transmitting station can occasionally test a higher rate.

Continuing with the description of the first filtering step, the receiving station filters out the transmission frame for no further processing if a measured PLCP header energy is below an energy threshold corresponding to the decoded data rate index. If the PLCP header energy is too low for the station to decode the transmission frame at the specific MCS, then the transmission frame is marked as "not for us," that is, filtered out.

The energy threshold defines an energy below which the transmission frame is not decodable at a data rate of the data rate index plus a data rate margin. The transmission frame could be consider not decodable at a 100% Package Error Rate (PER), for example, such that the energy threshold is the energy at the 100% PER plus the data rate margin.

The data rate margin used to set the energy threshold values per MCS index for this first filtering step may be based on worst-case scenario assumptions. This is because it is desirable to have almost no risk of filtering out a transmission frame that has a chance of being fully decoded successfully. The exact data rate margin is selected based on design choice though. In this example, it is first assumed that the channel between the transmitting and receiving stations is a white Gaussian noise (AWGN) channel over which interference spreads easily. The access point may be assumed to be an 8×8 access point with 8×2 beamforming. Thermal noise at the receiving station is assumed. These assumptions translate into a 10 dBm margin. And the energy threshold per MCS index is set according to MCS disconnection (100% PER) plus the 10 dBm margin. In this example, MCS11 shown in the table has a disconnection point of −65 dB, then with the data rate margin of −10 dBm, the energy threshold is −75 dBm.

This first filtering step filters received transmission frames at an earlier stage in the reception flow, and effectively reduces the station's deafness time. While energy threshold may be quite high, thereby reducing the filter accuracy, the rationale is to not filter out a transmission frame that the station has a chance to decode successfully. A more accurate filter is achieved in the second filtering step discussed below. The first step filtering may be performed by firmware in the LMAC, for example.

Second Filtering Step Based on a Decoding Sample

The wireless client STA may be relatively distant from the access point AP, still within range to receive the PLCP header, but not to decode the MAC header. This is the processing point of the first filtering step, the PLCP energy-based filtering. There are transmission frames with no chance to decode the MAC header and network data successfully, so the filtering stops after the first filtering step.

The second filtering step is performed if the transmission frame was not filtered out in the first filtering step. The station's processor decodes a sample portion of data codewords of the transmission frame. If the decoding of the sample portion of data codewords fails, the station's processor filters out the transmission frame for no further processing. If the transmission frame is not filtered out in the second filtering step, the station decodes a remainder of the transmission frame.

The sample portion of data codewords is a predetermined percentage of all of the data codewords of the transmission frame, that is, the Medium Access Control (MAC) layer Protocol Data Unit (MPDU). The predetermined percentage may be, for example, 10%. The sample might include codewords from the MAC header and/or the network data. The sample portion of data codewords may comprise Low Density Parity Check (LDPC) data codewords.

The MAC header has the transmitter and receiver addresses, which allows the station to know whether or not the transmission frame is for the particular station. The MAC header is coded with the coding rate of the network data. The MAC header modulation is significantly different from the PLCP header modulation. There may be cases where the PLCP header can be decoded successfully, but not the MAC header.

The station's processor filters out the transmission frame for no further processing by providing a recommendation to the LMAC on whether or not to filter out the transmission frame. The transmission frame will not be filtered out if there is a chance to successfully decode even a small portion of the A-MPDU. If the recommendation is to filter out the transmission frame, the transmission frame is dropped, and any suitable "not for us" procedure is performed. Otherwise, the processor continues decoding the A-MPDU and waits for first successfully decoded MAC header in order to perform known address matching. Some wireless transmission protocols (e.g., IEEE 802.11n protocol onwards) include aggregation, meaning there is one PLCP header and a plurality of MAC headers with respective data for this one PLCP header.

The decoding of the second filtering step may be performed by a hardware processor, such as a Digital Signal Processor (DSP). Also, this second filtering step adapts any reception signal without characterizing the signal in advance, as required in the first filtering step, but is instead on-the-fly.

FIG. 4 is a flowchart illustrating a wireless signal processing method 500 in accordance with aspects of the disclosure.

At block 410, a wireless signal carrying a transmission frame having a physical layer header including a data rate index is received.

At block 420, the physical layer header including the data rate index is decoded.

At block 430, the transmission frame is filtered out for no further processing if a measured physical layer header energy is below an energy threshold corresponding to the decoded data rate index.

At block 440, a sample portion of data codewords of the transmission frame is decoded if the transmission frame is not filtered out. The sample portion of data codewords is less than all of the data codewords of the transmission frame.

At block 440, the transmission frame is filtered out for no further processing if the decoding of the sample portion of data codewords fails. Otherwise, a remainder of the transmission frame is decoded.

Figure 5:
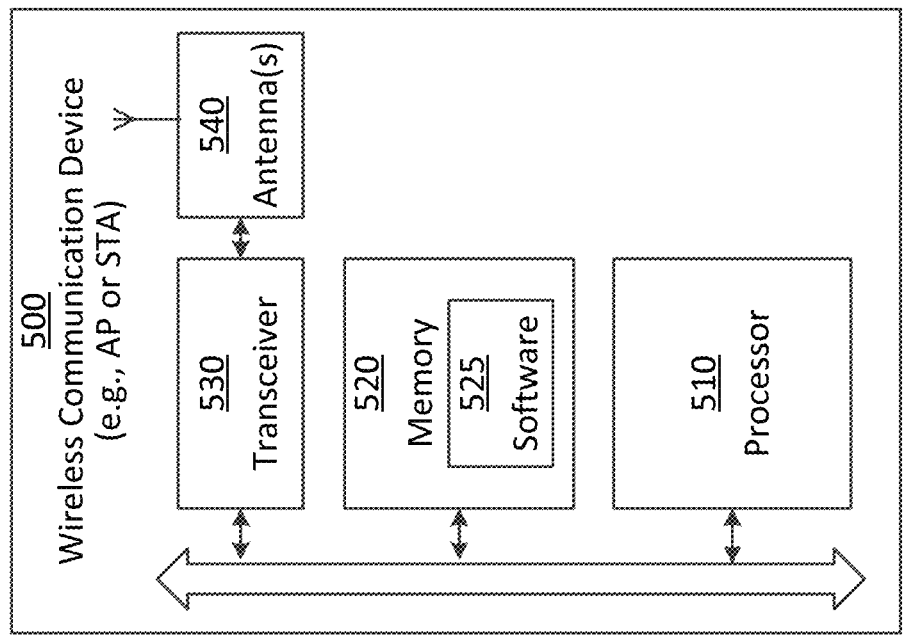
FIG. 5 is a block diagram illustrating an exemplary wireless communication device configured to filter out unwanted frames carried on a received wireless signal in accordance with various aspects of the disclosure.

FIG. 5 is a block diagram illustrating an exemplary wireless communication device configured to filter out unwanted frames carried on a received wireless signal in accordance with various aspects of the disclosure. The wireless device 500 may be an access point (AP) or a client station (STA), for example, as described with reference to FIGS. 1-4.

The aspects disclosed herein are applicable to wireless communication devices, which include, for example, access points (APs) and their associated client stations (STAs). For ease of explanation, the disclosure will often refer to each of these wireless devices generically as a station. It is understood that unless stated otherwise, any description of aspects of an access point, client station, or simply a station is applicable to either type of wireless communication device. It is also contemplated that the concepts disclosed herein may be applicable to other wireless communication devices not specifically mentioned. The explicit disclosure of access points and client stations is for ease of explanation and not meant to be limiting unless stated otherwise.

The wireless device 500 may include processor 510, memory 520, transceiver 530, and antenna 540. Each of these modules may communicate, directly or indirectly, with one another (e.g., via one or more buses).

The memory 520 may include random access memory (RAM) and/or read only memory (ROM). The memory 1010 may store computer-readable, computer-executable software 525 including instructions that, when executed, cause the processor 510 to perform various functions described herein (e.g., decode and filter transmission frames). In some cases, the software 525 may not be directly executable by the processor 510, but may cause a computer (e.g., when compiled and executed) to perform functions described herein. The processor 510 may include an intelligent hardware device, (e.g., a central processing unit (CPU), a microcontroller, an application specific integrated circuit (ASIC), etc.)

The transceiver 530 may communicate bi-directionally, via one or more antennas, wired, or wireless links, with one or more networks, as described above. For example, the transceiver 530 may communicate bi-directionally with an access point AP or a client station STA. The transceiver 530 may also include a modem to modulate the packets and provide the modulated packets to the antenna 540 for transmission, and to demodulate packets received from the antenna 540. In some cases, the wireless device 500 may include a single antenna 540. However, in some cases the device may have more than one antenna 540, which may be capable of concurrently transmitting or receiving multiple wireless transmissions.

The processor 510 may be a general-purpose processor, a digital signal processor (DSP), an ASIC, an field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Thus, the functions described herein may be performed by one or more other processing units (or cores), on at least one integrated circuit (IC). In various examples, different types of ICs may be used (e.g., Structured/Platform ASICs, an FPGA, or another semi-custom IC), which may be programmed in any manner known in the art. The functions of each unit may also be implemented, in whole or in part, with instructions embodied in a memory, formatted to be executed by one or more general or application-specific processors.

The aspects of this disclosure are application to any Wireless Local Area Network (WLAN) communication protocol that uses a listen-before talk-type mechanism, such as Clear Channel Assessment. One example is the IEEE 802.11 protocol, though the disclosure is not limited in this respect.

The aspects of this disclosure filters out unwanted frames in an improved manner by avoiding deafness, and improving connection stability, throughput, latency, and power consumption of a wireless stations in congested environments.

Power consumption is reduced because the station can go into power save mode rather than remain active in order to decode transmission frames that are not directed to it. A sleeping station that wakes for target beacon transmission time (TBTT) but does not receive beacons will no longer change to active mode to increase the chance of receiving beacons and avoiding disconnection from the access point. In extreme cases, a significant number of consecutive missed beacons leads to disconnection and link instability.

The techniques of this disclosure may also be described in the following examples.

Example 1. A method of processing wireless signals, the method comprising: receiving a wireless signal carrying a transmission frame having a physical layer header including a data rate index; decoding the physical layer header including the data rate index; filtering out the transmission frame for no further processing if a measured physical layer header energy is below an energy threshold corresponding to the decoded data rate index; decode a sample portion of data codewords of the transmission frame if the transmission frame is not filtered out, wherein the sample portion of data codewords is less than all of the data codewords of the transmission frame; and filtering out the transmission frame for no further processing if the decoding of the sample portion of data codewords fails, and otherwise decode a remainder of the transmission frame.

Example 2. The method of example 1, wherein the data rate index is a Modulation and Coding Scheme (MCS) index.

Example 3. The method of example 1, wherein the physical layer header is a Physical Layer Convergence Protocol (PLCP) header.

Example 4. The method of example 1, further comprising: measuring the physical layer header energy based on Received Signal Strength Indicator (RSSI).

Example 5. The method of example 1, wherein the energy threshold defines an energy below which the transmission frame is not decodable at a data rate of the data rate index plus a data rate margin.

Example 6. The method of example 5, wherein the transmission frame is not decodable at a 100% Package Error Rate (PER), such that the energy threshold is the energy at the 100% PER plus the data rate margin.

Example 7. The method of example 1, wherein the sample portion of data codewords is a predetermined percentage of all of the data codewords of the transmission frame.

Example 8. The method of example 7, wherein the predetermined percentage is 10%.

Example 9. The method of example 1, wherein the sample portion of data codewords comprises Low Density Parity Check (LDPC) data codewords.

Example 10. The method of example 1, wherein the frame is a Medium Access Control (MAC) layer Protocol Data Unit (MPDU).

Example 11. The method of example 1, wherein the decoding is performed by a Digital Signal Processor (DSP).

Example 12. The method of example 1, wherein the filtering out if the measured physical layer header energy is below the energy threshold corresponding to the decoded data rate index, is performed by firmware.

Example 13. The method of example 1, wherein the filtering out the transmission frame for no further processing if the decoding of the sample portion of data codewords fails, is performed at least partially by hardware.

Example 14. The method of example 13, wherein the hardware is a Digital Signal Processor (DSP).

Example 15. The method of example 1, wherein the method of processing the wireless signals is performed in accordance with the IEEE 802.11 standard.

Example 16. A wireless device, comprising: a transceiver configured to receive a wireless signal carrying a transmission frame having a physical layer header including a data rate index; one or more processors; and a non-transitory processor-readable medium configured to store instructions that, when performed by the one or more processors, cause the one or more processors to: decode the physical layer header including the data rate index; filter out the transmission frame for no further processing if a measured physical layer header energy is below an energy threshold corresponding to the decoded data rate index; decode a sample portion of data codewords of the transmission frame if the transmission frame is not filtered out, wherein the sample portion of data codewords is less than all of the data codewords of the transmission frame; and filter out the transmission frame for no further processing if the decoding of the sample portion of data codewords fails, and otherwise continue to decode a remainder of the transmission frame.

Example 17. The wireless device of example 16, further comprising: a Digital Signal Processor (DSP) configured to perform the decoding.

Example 18. The wireless device of example 16, wherein the wireless device is an access point.

Example 19. The wireless device of example 16, wherein the wireless device is a wireless station.

Example 20. The wireless device of example 16, wherein the data rate index is a Modulation and Coding Scheme (MCS) index.

Example 21. The wireless device of example 16, wherein the physical layer header is a Physical Layer Convergence Protocol (PLCP) header.

Example 22. The wireless device of example 16, further comprising: wherein the physical layer header energy is based on Received Signal Strength Indicator (RSSI).

Example 23. The wireless device of example 16, wherein the energy threshold defines an energy below which the transmission frame is not decodable at a data rate of the data rate index plus a data rate margin.

Example 24. The wireless device of example 23, wherein the transmission frame is not decodable at a 100% Package Error Rate (PER), such that the energy threshold is the energy at the 100% PER plus the data rate margin.

Example 25. The wireless device of claim 16, wherein the sample portion of data codewords is a predetermined percentage of all of the data codewords of the transmission frame.

Example 26. A method of processing wireless signals, the method comprising: receiving a wireless signal carrying a transmission frame having a physical layer header including a data rate index; decoding the physical layer header including the data rate index; filtering out the transmission frame for no further processing if a measured physical layer header energy is below an energy threshold corresponding to the decoded data rate index; decode a sample portion of data codewords of the transmission frame if the transmission frame is not filtered out, wherein the sample portion of data codewords is less than all of the data codewords of the transmission frame; and filtering out the transmission frame for no further processing if the decoding of the sample portion of data codewords fails, and otherwise decode a remainder of the transmission frame.

Example 27. The method of example 26, wherein the data rate index is a Modulation and Coding Scheme (MCS) index.

Example 28. The method of any one or more of examples 26-27, wherein the physical layer header is a Physical Layer Convergence Protocol (PLCP) header.

Example 29. The method of any one or more of examples 26-28, further comprising: measuring the physical layer header energy based on Received Signal Strength Indicator (RSSI).

Example 30. The method of any one or more of examples 26-29, wherein the energy threshold defines an energy below which the transmission frame is not decodable at a data rate of the data rate index plus a data rate margin.

Example 31. The method of any one or more of examples 26-30, wherein the transmission frame is not decodable at a 100% Package Error Rate (PER), such that the energy threshold is the energy at the 100% PER plus the data rate margin.

Example 32. The method of any one or more of examples 26-31, wherein the sample portion of data codewords is a predetermined percentage of all of the data codewords of the transmission frame.

Example 33. The method of any one or more of examples 26-32, wherein the predetermined percentage is 10%.

Example 34. The method of any one or more of examples 26-33, wherein the sample portion of data codewords comprises Low Density Parity Check (LDPC) data codewords.

Example 35. The method of any one or more of examples 26-34, wherein the frame is a Medium Access Control (MAC) layer Protocol Data Unit (MPDU).

Example 36. The method of any one or more of examples 26-35, wherein the decoding is performed by a Digital Signal Processor (DSP).

Example 37. The method of any one or more of examples 26-36, wherein the filtering out if the measured physical layer header energy is below the energy threshold corresponding to the decoded data rate index, is performed by firmware.

Example 38. The method of any one or more of examples 26-37, wherein the filtering out the transmission frame for no further processing if the decoding of the sample portion of data codewords fails, is performed at least partially by hardware.

Example 39. The method of any one or more of examples 26-38, wherein the hardware is a Digital Signal Processor (DSP).

Example 40. The method of any one or more of examples 26-39, wherein the method of processing the wireless signals is performed in accordance with the IEEE 802.11 standard.

Example 41. A wireless device, comprising: a transceiving means for receiving a wireless signal carrying a transmission frame having a physical layer header including a data rate index; one or more processors; and a non-transitory processor-readable medium for storing instructions that, when performed by the one or more processors, cause the one or more processors to: decode the physical layer header including the data rate index; filter out the transmission frame for no further processing if a measured physical layer header energy is below an energy threshold corresponding to the decoded data rate index; decode a sample portion of data codewords of the transmission frame if the transmission frame is not filtered out, wherein the sample portion of data codewords is less than all of the data codewords of the transmission frame; and filter out the transmission frame for no further processing if the decoding of the sample portion of data codewords fails, and otherwise continue to decode a remainder of the transmission frame.

Example 42. The wireless device of example 41, further comprising: a Digital Signal Processing means (DSP) for performing the decoding.

Example 43. The wireless device of any one or more of examples 41-42, wherein the wireless device is an access point.

Example 44. The wireless device of any one or more of examples 41-43, wherein the wireless device is a wireless station.

Example 45. The wireless device of any one or more of examples 41-44, wherein the data rate index is a Modulation and Coding Scheme (MCS) index.

Example 46. The wireless device of any one or more of examples 41-45, wherein the physical layer header is a Physical Layer Convergence Protocol (PLCP) header.

Example 47. The wireless device of any one or more of examples 41-46, further comprising: wherein the physical layer header energy is based on Received Signal Strength Indicator (RSSI).

Example 48. The wireless device of any one or more of examples 41-47, wherein the energy threshold defines an energy below which the transmission frame is not decodable at a data rate of the data rate index plus a data rate margin.

Example 49. The wireless device of any one or more of examples 41-48, wherein the transmission frame is not decodable at a 100% Package Error Rate (PER), such that the energy threshold is the energy at the 100% PER plus the data rate margin.

Example 50. The wireless device of any one or more of examples 41-49, wherein the sample portion of data codewords is a predetermined percentage of all of the data codewords of the transmission frame.

While the foregoing has been described in conjunction with exemplary aspect, it is understood that the term "exemplary" is merely meant as an example, rather than the best or optimal. Accordingly, the disclosure is intended to cover alternatives, modifications and equivalents, which may be included within the scope of the disclosure.

Although specific aspects have been illustrated and described herein, it will be appreciated by those of ordinary skill in the art that a variety of alternate and/or equivalent implementations may be substituted for the specific aspects shown and described without departing from the scope of the present application. This application is intended to cover any adaptations or variations of the specific aspects discussed herein.

The invention claimed is:

1. A method of processing wireless signals, the method comprising:

receiving a wireless signal carrying a transmission frame having a physical layer header including a data rate index;

decoding the physical layer header including the data rate index;

filtering out the transmission frame for no further processing if a measured physical layer header energy is below an energy threshold corresponding to the decoded data rate index;

decode a sample portion of data codewords of the transmission frame if the transmission frame is not filtered out, wherein the sample portion of data codewords is less than all of the data codewords of the transmission frame; and filtering out the transmission frame for no further processing if the decoding of the sample portion of data codewords fails, and otherwise decode a remainder of the transmission frame.

2. The method of claim 1, wherein the data rate index is a Modulation and Coding Scheme (MCS) index.

3. The method of claim 1, wherein the physical layer header is a Physical Layer Convergence Protocol (PLCP) header.

4. The method of claim 1, further comprising:
measuring the physical layer header energy based on Received Signal Strength Indicator (RSSI).

5. The method of claim 1, wherein the energy threshold defines an energy below which the transmission frame is not decodable at a data rate of the data rate index plus a data rate margin.

6. The method of claim 5, wherein the transmission frame is not decodable at a 100% Package Error Rate (PER), such that the energy threshold is the energy at the 100% PER plus the data rate margin.

7. The method of claim 1, wherein the sample portion of data codewords is a predetermined percentage of all of the data codewords of the transmission frame.

8. The method of claim 7, wherein the predetermined percentage is 10%.

9. The method of claim 1, wherein the sample portion of data codewords comprises Low Density Parity Check (LDPC) data codewords.

10. The method of claim 1, wherein the frame is a Medium Access Control (MAC) layer Protocol Data Unit (MPDU).

11. The method of claim 1, wherein the decoding is performed by a Digital Signal Processor (DSP).

12. The method of claim 1, wherein the filtering out if the measured physical layer header energy is below the energy threshold corresponding to the decoded data rate index, is performed by firmware.

13. The method of claim 1, wherein the filtering out the transmission frame for no further processing if the decoding of the sample portion of data codewords fails, is performed at least partially by hardware.

14. The method of claim 13, wherein the hardware is a Digital Signal Processor (DSP).

15. The method of claim 1, wherein the method of processing the wireless signals is performed in accordance with the IEEE 802.11 standard.

16. A wireless device, comprising:
a transceiver configured to receive a wireless signal carrying a transmission frame having a physical layer header including a data rate index;
one or more processors; and
a non-transitory processor-readable medium configured to store instructions that, when performed by the one or more processors, cause the one or more processors to:
decode the physical layer header including the data rate index;
filter out the transmission frame for no further processing if a measured physical layer header energy is below an energy threshold corresponding to the decoded data rate index;
decode a sample portion of data codewords of the transmission frame if the transmission frame is not filtered out, wherein the sample portion of data codewords is less than all of the data codewords of the transmission frame; and
filter out the transmission frame for no further processing if the decoding of the sample portion of data codewords fails, and otherwise continue to decode a remainder of the transmission frame.

17. The wireless device of claim 16, further comprising:
a Digital Signal Processor (DSP) configured to perform the decoding.

18. The wireless device of claim 16, wherein the wireless device is an access point.

19. The wireless device of claim 16, wherein the wireless device is a wireless station.

20. The wireless device of claim 16, wherein the data rate index is a Modulation and Coding Scheme (MCS) index.

21. The wireless device of claim 16, wherein the physical layer header is a Physical Layer Convergence Protocol (PLCP) header.

22. The wireless device of claim 16, further comprising:
wherein the physical layer header energy is based on Received Signal Strength Indicator (RSSI).

23. The wireless device of claim 16, wherein the energy threshold defines an energy below which the transmission frame is not decodable at a data rate of the data rate index plus a data rate margin.

24. The wireless device of claim 23, wherein the transmission frame is not decodable at a 100% Package Error Rate (PER), such that the energy threshold is the energy at the 100% PER plus the data rate margin.

25. The wireless device of claim 16, wherein the sample portion of data codewords is a predetermined percentage of all of the data codewords of the transmission frame.

* * * * *